2,927,064
REFINING OF ALPHA-METHYLBENZYL ETHER

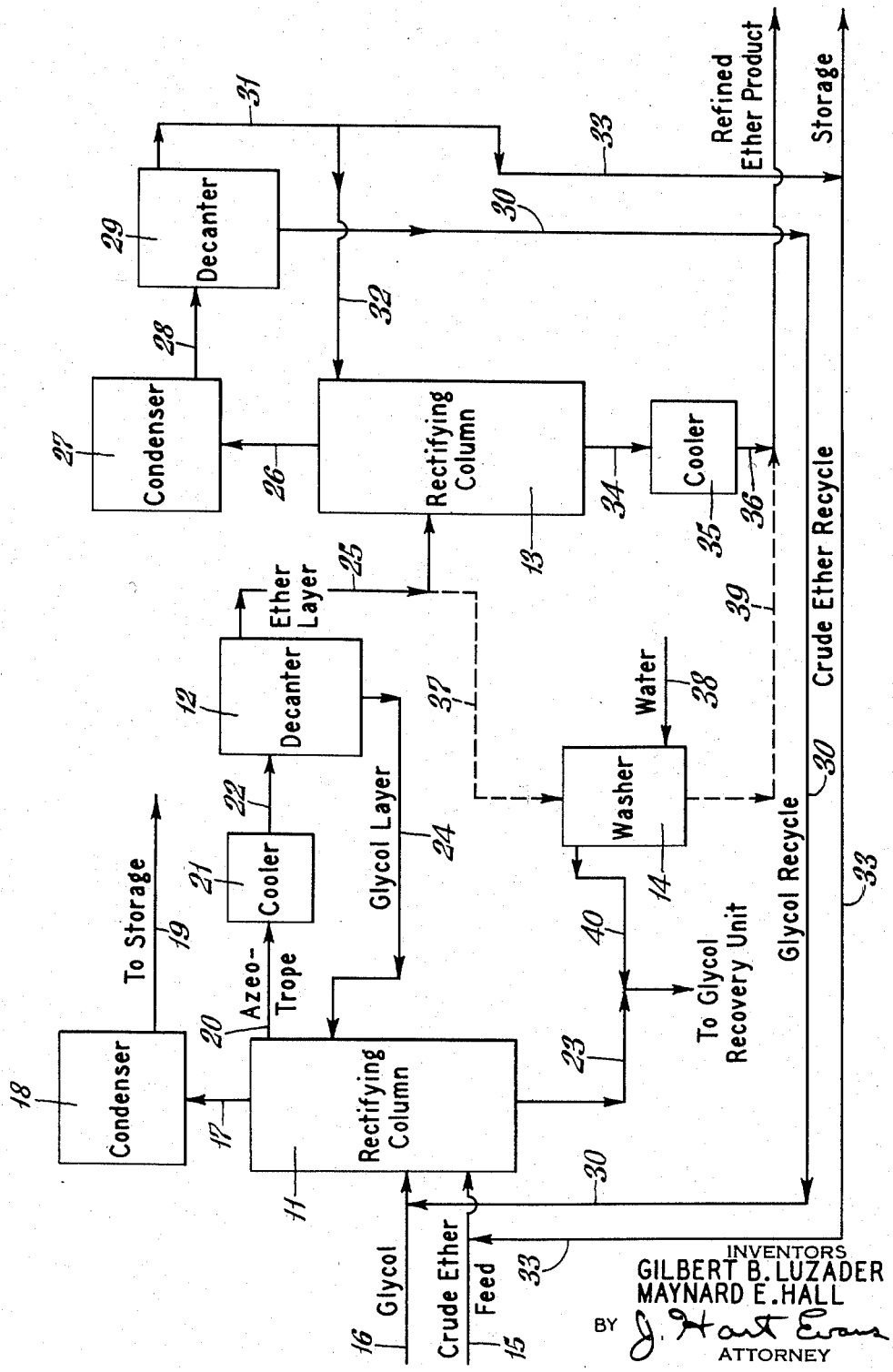

Gilbert B. Luzader, South Charleston, and Maynard E. Hall, Dunbar, W. Va., assignors to Union Carbide Corporation, a corporation of New York Application March 11, 1958, Serial No. 720,630

9 Claims. (Cl. 202—42)

This application relates to chemical processes. More particularly, it relates to processes for the refining of alpha-methylbenzyl ether by azeotropic distillation.

Large quantities of styrene are produced today by the catalytic dehydration of phenyl methyl carbinol. The reaction may be represented in this manner:

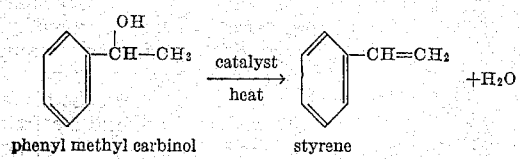

As a side reaction in this process, a small amount of the phenyl methyl carbinol is dehydrated to from alpha-methylbenzyl ether, as represented by the equation:

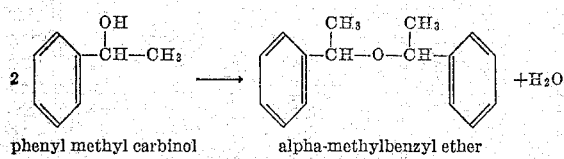

While the alpha-methylbenzyl ether is a valuable by-product, the catalyst and operating conditions are ordinarily chosen with a view to producing the largest possible proportion of styrene. With the process so operated, the crude mixture produced by the dehydration of styrene will include about five percent by weight of alpha-methylbenzyl ether, which must then be recovered for economic operation.

A distilland obtained from the continuous styrene production process contains from 20 to 60 percent by weight of alpha-methylbenzyl ether and this distilland is subjected to a batch distillation at reduced pressure, usually about 30 millimeters of mercury. In the course of this distillation, there is removed as distillate a "crude ether" fraction. This "crude ether" may comprise from about 40 to 85 percent by weight of alpha-methylbenzyl ether. To be suitable for sale at present, refined alpha-methylbenzyl ether must meet a commercial specification of a 90 percent by weight ether content, measured by infrared spectroscopy. This specification is derived from use of the ether as a plasticizer for resins of the "Saran" type. In this application the 90 percent minimum assures resins of consistent and predictable physical properties. The crude ether obtained from the styrene production unit contains such impurities as aromatic hydrocarbons with both saturated and unsaturated aliphatic groups, and mixed aromatic ethers of the type obtained by the dehydration of a mixture of alcohols such as benzyl alcohol and phenyl methyl carbinol.

The impurities most difficult to remove are distyrene, or diphenyl butene-3, and an unknown hydrocarbon which exhibits an infrared absorption at 13.7 microns. At atmospheric pressure alpha-methylbenzyl ether boils at a temperature of 281° C. while distyrene boils at 305° C. and the unknown hydrocarbon at about 291° C. Known commercial practice employs successive distillations to refine the alpha-methylbenzyl ether. Because of the high boiling points of the ether and of the chief impurities, vacuum distillation is necessary. The closeness of the boiling points of alpha-methylbenzyl ether, distyrene and the unknown hydrocarbon make it necessary to employ a high reflux ratio in the vacuum distillations, which results in lowered column throughput. Stills of high efficiency, that is, of 30 to 40 theoretical plates are required for good separation. Such special stills add greatly to the cost of the recovery.

Under optimum conditions at least two vacuum distillations are required to produce refined ether meeting the commercial specification of 90 percent ether. Frequently, however, further redistillation is required, further reducing the proportion of ether recovered. Optimum recovery is about 45 percent by weight of the alpha-methylbenzyl ether present in the crude ether obtained from the styrene process. Because of the low percentage recovery and the high cost of the vacuum distillations required, it is frequently economically unfeasible to recover alpha-methylbenzyl ether, as a by-product of styrene production, with these conventional techniques.

We have now found that azeotropic distillation can be employed to refine the crude alpha-methylbenzyl ether obtained as a by-product in the dehydration of phenyl methyl carbinol to yield styrene. Our process is based on our discovery that both ethylene glycol and diethylene glycol will individually form heterogeneous azeotropes with alpha-methylbenzyl ether. Being heterogeneous, the azeotropes separate upon condensation and cooling and a good separation of the two layers occurs with both compounds.

The azeotrope of ethylene glycol with alpha-methylbenzyl ether has a boiling temperature of 121° C. at a reduced pressure of 50 millimeters of mercury. This azeotrope separates into a top layer consisting of 98 percent by weight of alpha-methylbenzyl ether and 2 percent by weight of ethylene glycol, and a bottom layer consisting of 96 percent by weight of ethylene glycol and 4 percent by weight of alpha-methylbenzyl ether. The volume ratio of top layer to bottom layer is 1 to 4.4. The azeotrope of diethylene glycol with alpha-methylbenzyl ether has a boiling temperature of 156° C. at a reduced pressure of 50 millimeters of mercury. This azeotrope separates into a top layer consisting of 98 percent by weight of alpha-methylbenzyl ether and 2 percent by weight of diethylene glycol, and a bottom layer consisting of 96 percent by weight of diethylene glycol, and 4 percent by weight of alpha-methylbenzyl ether. The volume ratio of top layer to bottom layer is 1 to 1.5. Diethylene glycol has the advantage that in its azeotrope the proportion of glycol required is much lower. With ethylene glycol, however, the still temperatures required are lower by about 35° C.

According to our invention, a crude feed containing alpha-methylbenzyl ether is mixed with an ethylene glycol, that is, ethylene glycol or diethylene glycol, and this mixture is distilled under reflux conditions. This crude feed may be the "crude ether" described above as the present starting material for refining alpha-methylbenzyl ether. If desired, however, it is possible to use the distilland from the continuous styrene process as crude feed, eliminating the batch distillation step. After non-azeotropic materials are distilled, the azeotrope is distilled and allowed to separate. The top layer thus formed consists primarily of alpha-methylbenzyl ether from which the minor proportion of glycol is removed by distillation at reduced pressure, with the alpha-methylbenzyl ether product normally being recovered as distilland. Alpha-methylbenzyl ether is recovered in yields of 60 to 75 percent. The bottom or glycol layer is recycled to form more azeotrope.

In a preferred embodiment of the invention, the crude feed contains at least about 40 percent by weight of alpha-methylbenzyl ether. To one volume of crude feed is added from one-fifth to one-half volume of glycol, depending on the percentage of ether in the crude feed. The mixture is charged to the kettle of a rectifying column having about 10 theoretical plates. Operating pressure is from 10 to 150 millimeters of mercury with about 50 millimeters preferred. Operating temperature with ethylene glycol is from 100° C. to 180° C. with about 135° C. preferred. With diethylene glycol the range is from 140° to 210° C. with about 175° C. preferred.

The rectifying column is operated to provide a reflux ratio of about 3 to 1 and distillate is removed until separation of the distillate occurs. This first distillate is discarded or conserved for other processing and the further distillate, which separates, is allowed to separate in a decanter. The top layer or ether layer is removed without reflux to a receiver while the bottom or glycol layer is returned to the top of the rectifying column in order to maintain the azeotrope. This procedure is continued until the distillate obtained no longer separates. The residues in the column may be retained therein to furnish glycols for the next charge, or the glycol may be distilled from the column and the residues discarded, as preferred.

The top or ether layer from the receiver is redistilled in a rectifying column having the equivalent of 10 theoretical plates. The column is operated at a reduced pressure of from 10 to 150 millimeters of mercury with about 50 millimeters preferred. Operating temperature is between 100° C. and 180° C. with about 140° C. preferred. The column is operated to provide a reflux ratio of about 2 to 1. The first distillate obtained is an azeotrope of alpha-methylbenzyl ether with substantially all of the glycol present in the top layer. The distillation is normally halted at this point and the alpha-methylbenzyl ether produced is removed as distilland. If desired, however, the distillation can be continued and alpha-methylbenzyl ether product recovered as distillate. In a somewhat different embodiment of the invention the top or ether layer from the azeotrope can be water washed to remove the contained glycol. Water is soluble in alpha-methylbenzyl ether only to the extent of less than 0.2 gram per 100 grams. Ether thus water washed would contain in excess of 90 percent by weight of alpha-methylbenzyl ether and would be suitable for most purposes.

Although the invention has been described above as a batch operation, it is well suited to continuous operation, as outlined in the flow sheet. The flow sheet shows a rectifying column 11 for the azeotropic distillation, a decanter 12 for separation of the azeotrope and a second rectifying column 13 for refining the top or ether layer from the azeotrope. Also shown is a washer 14 which may be employed instead of the second rectifying column 13 to refine the ether layer of the azeotrope.

More particularly, in the flow sheet, the crude ether feed in feed line 15 is introduced into the rectifying column 11. Glycol, either ethylene glycol or diethylene glycol, is introduced into the rectifying column 11 through glycol feed line 16. That portion of the distillate other than the azeotrope is removed from column 11 through line 17 wherein it is conducted to a condenser 18. This material is then removed from the condenser 18 through line 19 and conducted therein to storage facilities prior to further processing or discard.

The azeotropic distillate obtained from rectifying column 11 is removed through line 20 to a cooler 21 and thence through line 22 to the decanter 12. The residue from the rectifying column 11 is removed through residue removal line 23 and conveyed therein to a glycol recovery unit, wherein the glycol can be recovered and eventually recycled to the process. In the decanter 12 the heterogeneous azeotrope separates and the bottom layer, substantially all glycol, is removed from the decanter 12 through line 24 and returned therein to the top of rectifying column 11 as reflux.

The top, or ether layer, is removed from decanter 12 through line 25 and conveyed therein to the second rectifying column 13. In the second column 13, the heterogeneous azeotrope of alpha-methylbenzyl ether and glycol is removed as vapor through line 26 to a condenser 27 and thence through line 28 to a decanter 29. In the decanter 29 the heterogeneous azeotrope separates and the bottom layer, substantially all glycol, is removed from the decanter 29 through line 30 and conveyed therein for eventual return to the process through glycol feed line 16. The top or ether layer, which contains some proportion of the principal impurities, is removed from the decanter 29 through line 31; this distillate stream is separated into a reflux stream, which is conveyed back to rectifying column 13 through line 32, and a stream which is conveyed through line 33 to storage facilities prior to further processing or to return to the process by way of crude ether feed line 15. The refined alpha-methylbenzyl ether is removed from the second rectifying column 13 as a distilland from the base of the column 13, through line 34 to a cooler 35 and thence to storage facilities through line 36. The greater part of the alpha-methylbenzyl ether fed to rectifying column 13 is thus removed as a distilland from the base of column 13 in the normal operation of the process. If desired, however, the alpha-methylbenzyl ether could be removed as distillate from column 13 by the use of a third rectifying column, not shown in the flow sheet, connected in series with column 13, with alpha-methylbenzyl ether being removed from the bottom of the additional column as distilland.

In a somewhat different embodiment of the process of the invention the top, or ether layer, from the decanter 12, rather than being conveyed to the second rectifying column 13, is conveyed through line 25 into line 37 and through line 37 into a washer 14. Water is introduced into washer 14 through line 38 and washed, refined alpha-methylbenzyl ether is removed as product through line 39 into line 36. The wash water containing glycol is removed from the washer 14 through line 40 and conveyed therein to a glycol recovery unit.

Numerous advantages of our process can be appreciated from the above description. The process of the invention recovers from 60 to 75 percent by weight of the alpha-methylbenzyl ether in the crude feed, whereas maximum recovery by methods heretofore known has been limited to 45 percent by weight. The rectifying columns employed in the process of the invention need only have the equivalent of about 10 theoretical plates whereas the prior method required the most efficient stills obtainable, with the equivalent of 30 to 40 theoretical plates, such stills being, of course, much more expensive to construct and maintain.

The process of the invention, operating on a crude feed from a styrene process making from 1 to 5 percent alpha-methylbenzyl ether product, will consistently yield refined ether containing in excess of 90 percent alpha-methylbenzyl ether. Prior methods required at least 5 percent alpha-methylbenzyl ether product from the styrene process to operate economically, and often required repeated distillations to yield an ether containing at least 90 percent by weight of alpha-methylbenzyl ether. The process of the invention requires but one refining distillation after the azeotropic distillation and even this single refining distillation can be replaced by water washing if desired. The process of the invention is also superior in requiring a reflux ratio of only 2 or 3 to 1 rather than 10 to 1 as required in the prior known methods.

*Example I*

The apparatus comprised a kettle on which was mounted a laboratory rectifying column 500 millimeters high and 34 millimeters in diameter. The column was packed with 0.16 inch by 0.16 inch stainless steel perforated "saddles" and had the equivalent of ten theoretical plates. One thousand grams of crude alpha-methylbenzyl ether feed, found by analysis to consist of 48 percent by weight alpha-methylbenzyl ether, 8 percent unknown hydrocarbon, 12 percent distyrene and 32 percent other impurities, were charged to the kettle, together with 200 grams of diethylene glycol. The operating pressure was 50 millimeters of mercury absolute and the maximum still kettle temperature was 175° C. After a total of 130 grams of homogeneous distillate was removed at a 3 to 1 reflux ratio, the distillate obtained was non-homogeneous and separated into an upper and a lower layer.

The non-homogeneous azeotropic distillate was removed from the column at no reflux and allowed to separate into two layers. Six hundred grams of the top or ether layer were recovered. The bottom or glycol layer was returned to the column. The 600 grams of ether layer was redistilled in the same column by simple distillation at a pressure of 50 millimeters of mercury absolute and with a 2 to 1 reflux ratio. There was recovered 357 grams of alpha-methylbenzyl ether having a purity of 92.7 percent. This recovery amounted to 71 percent of the ether in the original crude feed.

*Example II*

The apparatus comprised a kettle on which was mounted a laboratory rectifying column 500 millimeters high and 34 millimeters in diameter. The column was packed with 0.16 inch by 0.16 inch stainless steel perforated "saddles" and had the equivalent of 10 theoretical plates. One thousand grams of crude alpha-methylbenzyl ether feed, found by analysis to consist of 48 percent by weight alpha-methylbenzyl ether, 8 percent unknown hydrocarbon, 12 percent distyrene and 32 percent other impurities were charged to the kettle, together with 200 grams of ethylene glycol. The operating pressure was 50 millimeters of mercury absolute and the maximum still kettle temperature was 135° C. After a total of 135 grams of homogeneous distillate was removed at a 3 to 1 reflux ratio, the distillate obtained was non-homogeneous and separated into an upper and a lower layer.

The non-homogeneous azeotropic distillate was removed from the column at no reflux and allowed to separate into two layers. A total of 674 grams of the top or ether layer were recovered. The bottom or glycol layer was returned to the column. The 674 grams of ether layer were redistilled in the same column by simple distillation at a pressure of 50 millimeters of mercury absolute and with a 2 to 1 reflux ratio. There was recovered 368 grams of specification-grade alpha-methylbenzyl ether having a purity of 92.5 percent. This recovery amounted to 70.9 percent of the ether in the original crude feed.

What is claimed is:

1. Process for producing refined alpha-methylbenzyl ether which comprises mixing an ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, and recovering alpha-methylbenzyl ether in a refined state from said upper layer.

2. Process for producing refined alpha-methylbenzyl ether which comprises mixing an ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, distilling said upper layer under reduced pressure to yield refined alpha-methylbenzyl ether as product.

3. Process for producing refined alpha-methylbenzyl ether which comprises mixing an ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, water washing said upper layer to remove said glycol therefrom and yield refined alpha-methylbenzyl ether as product.

4. Process for producing refined aplha-methylbenzyl ether which comprises mixing ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, and recovering alpha-methylbenzyl ether in a refined state from said upper layer.

5. Process for producing refined alpha-methylbenzyl ether which comprises mixing ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, distilling said upper layer under reduced pressure to yield refined alpha-methylbenzyl ether as product.

6. Process for producing refined alpha-methylbenzyl ether which comprises mixing ethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, water washing said upper layer to remove said glycol therefrom and yield refined alpha-methybenzyl ether as product.

7. Process for producing refined alpha-methylbenzyl ether which comprises mixing diethylene glycol with a crude feed containing said ether, heating the thus formed mixture to vaporize a heterogeneous azeotrope of said glycol with ether, isolating and cooling said azeotrope, permitting said azeotrope to separate upon cooling into an upper layer composed predominately of said ether and a lower layer composed predominately of said glycol, and recovering alpha-methylbenzyl ether in a refined state from said upper layer.

8. Process for producing refined alpha-methylbenzyl ether which comprises mixing diethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, distilling said upper layer under reduced pressure to yield refined alpha-methylbenzyl ether as product.

9. Process for producing refined alpha-methylbenzyl ether which comprises mixing diethylene glycol with a crude feed containing said ether, heating the thus formed mixture to vaporize a heterogeneous azeotrope of said glycol with said ether, isolating and cooling said azeotrope, permitting said azeotrope to separate upon cooling into an upper layer composed predominately of said ether and a lower layer composed predominately of said glycol, water washing said upper layer to remove said glycol therefrom and yield refined alpha-methylbenzyl ether as product.

References Cited in the file of this patent

UNITED STATES PATENTS

| | | |
|---|---|---|
| 2,496,207 | Handlos et al. | Jan. 31, 1950 |
| 2,527,916 | Churchill | Oct. 31, 1950 |
| 2,664,435 | Burton et al. | Dec. 29, 1953 |

OTHER REFERENCES

Horsley: "Azeotropic Data," published by American Chemical Society, 1952 (page 68 relied upon).